United States Patent
Sinclair

(10) Patent No.: US 10,091,353 B1
(45) Date of Patent: Oct. 2, 2018

(54) IDENTICAL CONVERSATION DETECTION SYSTEMS AND PROCESSES

(71) Applicant: Securus Technologies, Inc., Dallas, TX (US)

(72) Inventor: Kenneth H. Sinclair, Newton, MA (US)

(73) Assignee: Securus Technologies, Inc., Carrollton, TX (US)

( * ) Notice: Subject to any disclaimer, the term of this patent is extended or adjusted under 35 U.S.C. 154(b) by 330 days.

(21) Appl. No.: 14/984,508

(22) Filed: Dec. 30, 2015

(51) Int. Cl.
*H04M 1/64* (2006.01)
*H04M 3/42* (2006.01)
*G10L 25/51* (2013.01)

(52) U.S. Cl.
CPC ......... *H04M 3/42221* (2013.01); *G10L 25/51* (2013.01)

(58) Field of Classification Search
CPC ................... H04M 3/2281; H04M 3/42221
USPC .................................. 379/88.01, 85
See application file for complete search history.

(56) References Cited

U.S. PATENT DOCUMENTS

| 6,347,373 | B1* | 2/2002 | Hoepman | H04L 9/321 380/277 |
| 9,621,713 | B1* | 4/2017 | Gainsboro | H04M 3/2281 |
| 2003/0035527 | A1* | 2/2003 | Baker | H04M 3/564 379/207.01 |
| 2011/0282953 | A1* | 11/2011 | Lee | H04L 12/586 709/206 |
| 2015/0281433 | A1* | 10/2015 | Gainsboro | H04M 3/2281 379/88.01 |

\* cited by examiner

*Primary Examiner* — Akelaw Teshale
(74) *Attorney, Agent, or Firm* — Fogarty LLP

(57) ABSTRACT

Systems and methods are described relating to detection of audio of voice communications from different reference points containing an identical conversation or portion of a conversation. A method can use an analytics module operating on at least one processor. Call signatures of a plurality of audio of voice communications are received. An index loaded with the call signatures is created, where segments of the call signatures are associated with buckets of the index. A first subset of one or more of the buckets associated with a number of the segments that exceeds a threshold is identified. An identical conversation portion in two or more of the plurality of audio of voice communications is identified based on a second subset of one or more of the buckets, where the first subset of one or more of the buckets is disregarded.

17 Claims, 2 Drawing Sheets

IDENTICAL CONVERSATION DETECTION SYSTEMS AND PROCESSES

TECHNICAL FIELD

The present disclosure relates generally to detection of audio of voice communications from different reference points having an identical conversation, and more particularly to detection of audio of voice communications from different reference points in one or more controlled-environment facilities having an identical conversation.

BACKGROUND

Traditional communication services of controlled-environment facilities (such as correctional facilities) include allowing residents (e.g., inmates) to place outbound telephone calls to non-residents of the controlled-environment facility. However, residents of controlled-environment facilities are typically restricted from unauthorized communications with other residents of the controlled-environment facility or other controlled-environment facilities. For example, in correctional facilities, inmates are typically prohibited from unauthorized communications with another inmate of the correctional facility or another correctional facility. Thus, many controlled-environment facilities implement systems that aim to prevent communications to unauthorized individuals.

One system that may be used, for example, in the context of telecommunications systems, may implement an account for each resident of the controlled-environment facility. The account for each resident may be associated with the resident's name and personal identification number (PIN), a financial account for payment of communications, and various biometric indications, such as sample voice recordings, for ensuring that the person using the account for communications is the resident identified with the account. A resident, once enrolled in the account, can then access the account for communications, such as telephone calls.

The account can have a list of allowed and/or un-allowed numbers or individuals that the resident may call. This restriction may seek to prevent communications by the resident to unauthorized individuals. However, some residents may circumvent this restriction by calling an allowed number or individual where an unauthorized individual is conferenced into the call, such as by a three-way call or by a telecommunications bridge. In other instances, some residents may circumvent the restriction by dialing an allowed number that then forwards the call to an unauthorized individual. Hence, a resident of a controlled-environment facility may communicate with another resident of the same or different controlled-environment facility, which can be an unauthorized communication.

SUMMARY

The present disclosure is directed to systems and methods which can detect an identical conversation portion in audio of voice communications from different reference points. The detection can be performed in the context of one or more controlled-environment facilities and an analytics facility. Some embodiments allow for analysis of many calls to detect an identical conversation on a large scale with efficient processing.

In an example embodiment, a method, which may be employed in various systems and/or facilities, uses an analytics module operating on at least one processor. Call signatures of a plurality of voice communications are received. The voice communications may include, for example, audio from telephone calls, voicemails, video conferences, webcasts, or any other verbal communication. An index loaded with the call signatures is created, where segments of the call signatures are associated with buckets of the index. A first subset of one or more of the buckets associated with a number of the segments that exceeds a threshold is identified. An identical conversation in two or more of the plurality of voice communications is identified based on a second subset of one or more of the buckets, where the first subset of one or more of the buckets is disregarded.

Another example embodiment comprises a system with one or more compression servers having one or more compression modules operable on at least one processor, and an analytics server having an analytics module operable on at least one processor. The one or more compression modules are operable to generate call signatures from audio of voice communications. The analytics module is operable to create an index and load the call signatures into the index. The index has buckets that are associated with segments of the call signatures. The analytics module further is operable to disregard ones of the buckets that are associated with a number of the call signatures that exceeds a threshold, and operable to identify an identical conversation portion in audio of two or more of the voice communications based on non-disregarded ones of the buckets.

A further embodiment is a non-transitory computer-readable storage medium having a computer program embodied thereon. The computer program includes program code instructions for creating an index loaded with call signatures, the call signatures being representative of audio of voice communications, the index having buckets, segments of the call signatures being associated with the buckets; program code instructions for identifying buckets that are associated with a number of call signatures that exceeds a threshold; and program code instructions for determining whether audio of two or more voice communications contain an identical conversation portion based on buckets that are associated with a number of call signatures that does not exceed the threshold, wherein the buckets that are associated with the number of call signatures that exceeds the threshold are disregarded.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present disclosure in order that the detailed description that follows may be better understood. Additional features and advantages will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
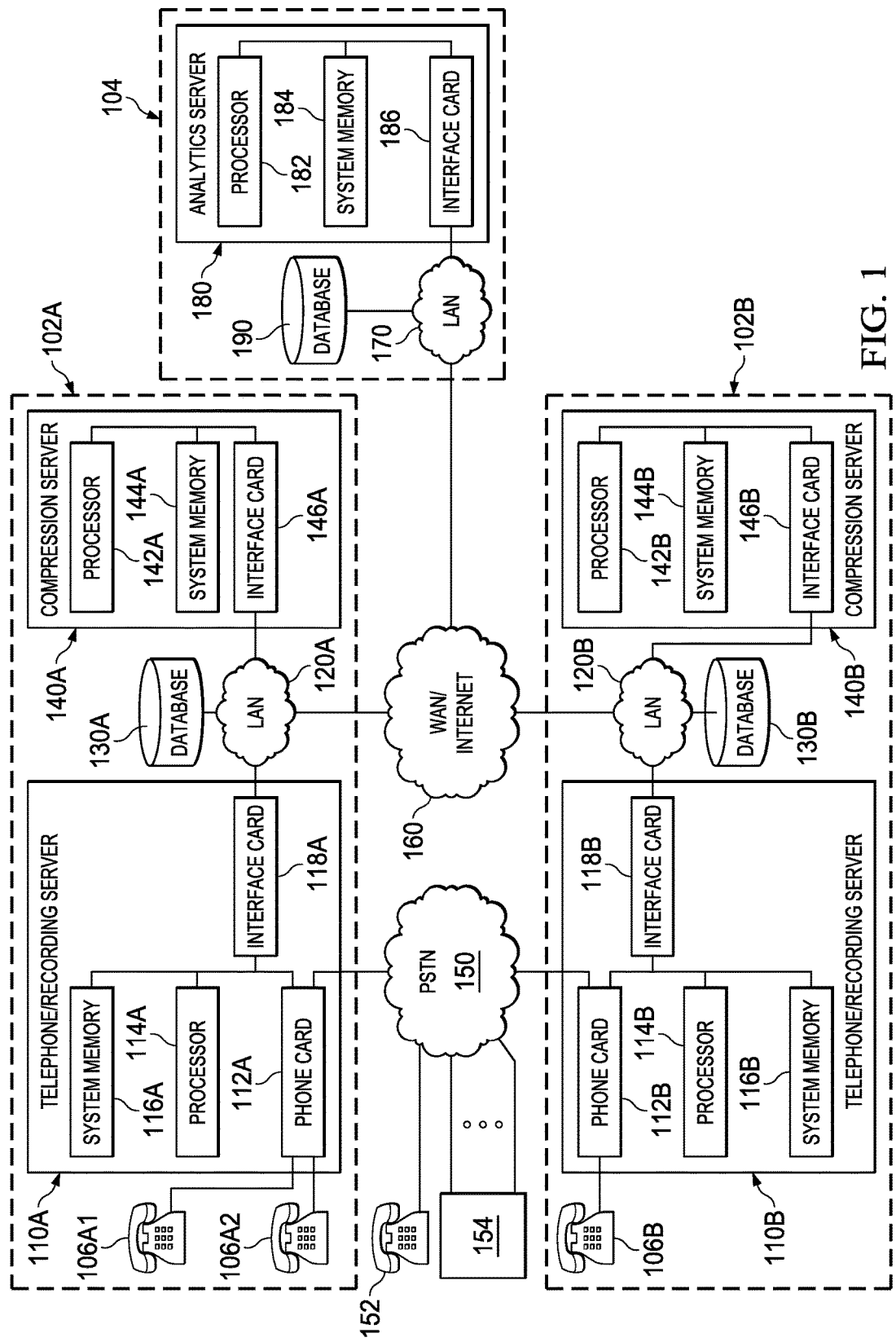

Having thus described some embodiments in general terms, reference will now be made to the accompanying drawings, which are not necessarily drawn to scale, and wherein:

FIG. 1 is a diagrammatic illustration of example detection system in accordance with some embodiments.

Figure 2:
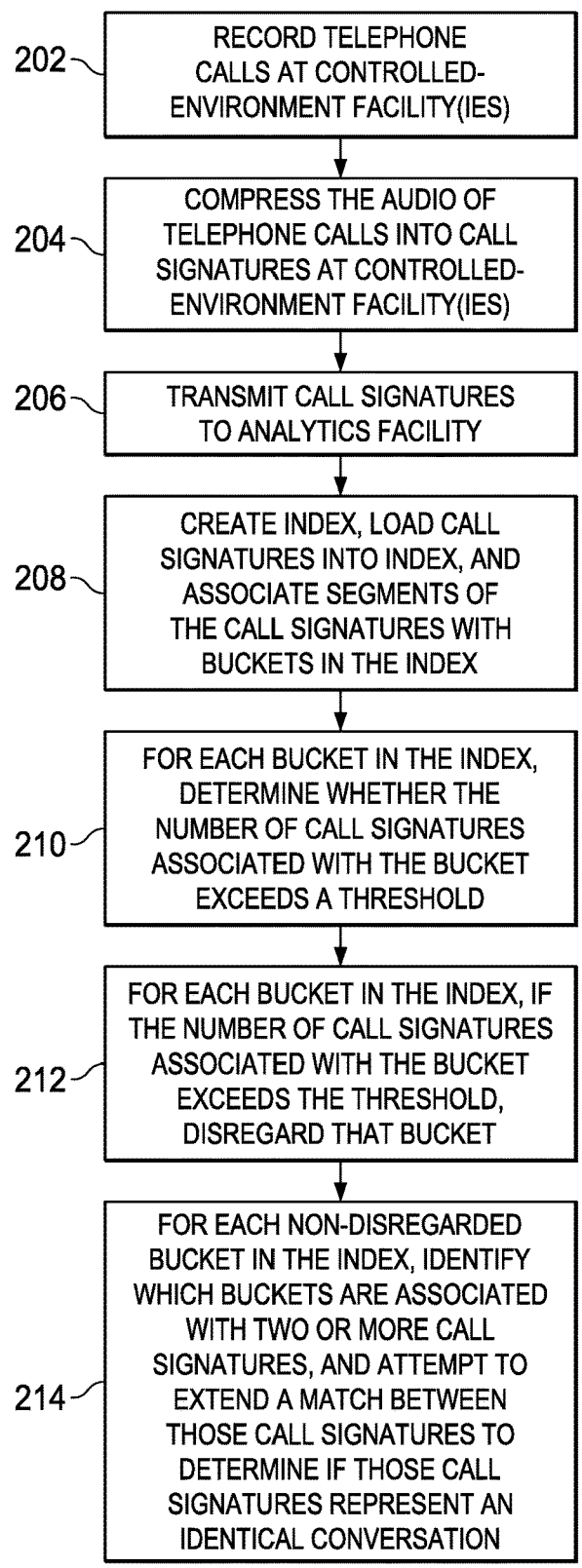

FIG. 2 is a flowchart of a process for detecting identical conversation portions in accordance with some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

Some embodiments now will be described more fully hereinafter with reference to the accompanying drawings. Other embodiments may be applied in many different forms, and this disclosure should not be construed as limited to the embodiments set forth herein. Rather, the example embodiments herein are provided so that this disclosure will be thorough and complete, and will fully convey the scope of the invention to those skilled in the art. One skilled in the art may be able to use the various embodiments of the invention.

Embodiments described below are described in the context of a computing and/or telecommunications environment. One having ordinary skill in the art will readily understand variations to the environment that may be made, such as modifications to networking, including whether devices (such as terminals, servers, databases, etc.) are directly operatively coupled together or operatively coupled together through a network (such as a local area network (LAN), a wide area network (WAN), the Internet, a combination thereof, or the like). Further, various processes may be described below as being performed on various devices, but one having ordinary skill in the art will readily understand that different processes can be performed on different devices or a combination of processes can be performed on one device, for example.

Additionally, this disclosure may describe embodiments being used in the context of a controlled-environment facility. Various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation facilities, such as drug and alcohol rehabilitation facilities, etc.), restricted living quarters (e.g., hotels, resorts, camps, dormitories, barracks, etc.), and the like. For convenience of explanation, various examples discussed herein are presented in the context of a correctional facility, or the like. It should be understood, however, that the systems and methods described herein may be similarly applicable to other types of controlled-environment facilities and their respective residents (e.g., a hospital and its patients, a school dormitory and its students, etc.). Various concepts of this disclosure, however, may be applied to other contexts, such as locations remote from the controlled-environment facility, including resident's or their friends/family's homes or a crime victim's home.

FIG. 1 is a diagrammatic illustration of example detection system in accordance with some embodiments. Although illustrated among various facilities in FIG. 1, the detection system may be located at a single controlled-environment facility, between separate controlled-environment facilities, between a combination of one or more controlled-environment facilities and one or more analytics facilities, or the like. One of ordinary skill in the art will readily understand many variations to the example detection system that are contemplated within the scope of other embodiments.

Although the example systems and methods described below refer to voice communications captured and/or recorded from telephone calls, it will be understood that voice communications captured and/or recorded from any source may be processed using the techniques described herein. For example, voice communications may include audio captured or recorded from telephone calls, video conferences, webcasts, or any other form of electronic communication. Such electronic voice communication may be provided to users via wired or wireless telephones, smartphones, computers (desktop, laptop, and tablet), video terminals, kiosks, and the like. Audio from such electronic communications may be captured or recorded at a user device or from analog or digital networks and lines carrying such electronic communications. Other voice communications may be recorded directly, such as statements made by an individual or conversations between two or more people that are captured by in-person recording equipment (e.g., security or monitoring systems, recording devices, etc.). Moreover, it will be understood that the voice communications may be captured or recorded for any purpose (e.g., security, voicemail, monitoring, documentation, etc.).

The term "conversation" as used herein is intended to be broadly interpreted to include any statements, audible utterances, or other sounds made by an individual, animal, mechanical or electrical device, or other object. This includes, for example, human speech, animal noises (e.g., barking, growling, etc.), electronic notifications or prompts (e.g., bells, chimes, pings, whistles, etc.), and natural sounds (flowing air, running water, creaking doors or floors, rolling tires, etc.). Where such sounds are not speech, portions of the sounds that correspond to vowel sounds may be used to create a call signature or seeds as discussed below. "Conversation" as used herein will further be understood to include portions of conversations or portions of a longer sound recording.

The illustrated detection system includes a first controlled-environment facility 102A, a second controlled-environment facility 102B, and an analytics facility 104 remote from the first and second controlled-environment facilities 102A and 102B. As illustrated, the first and second controlled-environment facilities 102A and 102B include many of the same or similar (although separate) components. For ease of discussion herein, a component having a reference number ending in "A" is in the first controlled-environment facility 102A, and a component having a reference number ending in "B" is in the second controlled-environment facility 102B. Descriptions of some of these components will be without regard to the designation "A" or "B" to avoid duplication of discussion, and such description will apply to components in both the first and second controlled-environment facilities 102A and 102B.

The first controlled-environment facility 102A includes a first telephone 106A1 and a second telephone 106A2, and the second controlled-environment facility 102B includes a telephone 106B. The controlled-environment facilities 102A and 102B each include a telephone/recording server device 110, a network (e.g., LAN) 120, a database (DB) device 130, and a compression server device 140.

The telephone/recording server device 110 operates a telephone/recording server and includes one or more phone cards (PC) 112, one or more processor (PROC) 114, such as a central processing unit (CPU), system memory (MEM) 116, and an interface card (INT) 118 coupled together by one or more bus. The one or more phone cards 112 may be purchased from Natural Microsystems, Dialogic, Brooktrout Technologies, or Pika Technologies, and in some embodiments, much of the low-level computation that is performed to extract voice parameters, etc. is performed by a digital signal processing (DSP) chip(s) on board the one or more phone cards 112. The one or more phone cards 112 is operatively coupled to one or more telephones (e.g., telephones 106A1 and 106A2, or telephone 106B), and is operatively coupled to a public switched telephone network (PSTN) 150. Hence, a telephone 106 is capable of placing a call through PSTN 150.

In various embodiments, the telephone/recording server device 110 may be a single-processor system including one processor 114, or a multi-processor system including two or more processors 114 (e.g., two, four, eight, or another suitable number). Processor(s) 114 may be any processor capable of executing program instructions. For example, in various embodiments, processor(s) 114 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 114 may commonly, but not necessarily, implement the same ISA.

System memory 116 may be configured to store program instructions and/or data accessible by processor(s) 114. In various embodiments, system memory 116 may be implemented using any suitable tangible or non-transitory memory medium, such as static random access memory (SRAM), synchronous dynamic RAM (SDRAM), nonvolatile/Flash-type memory, or any other type of memory. As illustrated, program instructions and data implementing certain operations may be stored within system memory 116 as program instructions and data storage, respectively. In other embodiments, program instructions and/or data may be received, sent, or stored upon different types of computer-accessible media or on similar media separate from system memory 116 or the telephone/recording server device 110. Generally speaking, a computer-readable medium may include any tangible or non-transitory storage media or memory media such as magnetic or optical media—e.g., disk or CD/DVD-ROM coupled to the telephone/recording server device 110 via an input/output (I/O) interface (not specifically illustrated), flash memory, random access memory (RAM), etc. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via interface card 118.

System memory 116 may include program instructions, configured to implement certain embodiments described herein, and data storage comprising various data accessible when program instructions are operated. In an embodiment, program instructions may include software elements corresponding to one or more of the various embodiments illustrated herein. For example, program instructions may be implemented in various embodiments using any desired programming language, scripting language, or combination of programming languages and/or scripting languages (e.g., C, C++, C#, JAVA®, JAVASCRIPT®, PERL®, etc.). Data storage may include data that may be used in these embodiments. In other embodiments, other or different software elements and data may be included.

Interface card 118 is coupled to a LAN 120 and may be configured to allow data to be exchanged between the telephone/recording server device 110 and another device coupled to the LAN 120, such as other computer systems, such as a server device and/or database device. In various embodiments, interface card 118 may support communication via wired and/or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol. The LAN 120 may be a wired and/or wireless network.

A database (DB) device 130, operating a database with an appropriate database management system (DBMS), is coupled to the LAN 120, for example, using one or more interface cards (not specifically shown). The database device 130 can include one or more processors for operating the DBMS, system memory for storing program instructions of the DBMS, and database memory for storing the database. Processor(s) in the database device 130 may be any processor capable of executing program instructions. For example, in various embodiments, processor(s) may be general-purpose or embedded processors implementing any of a variety of ISAs, such as the x86, POWERPC®, ARM®, SPARC®, or MIPS® ISAs, or any other suitable ISA. In multi-processor systems, each of processors may commonly, but not necessarily, implement the same ISA. System memory of the database device may be configured to store program instructions and/or data accessible by processor. In various embodiments, system memory may be implemented using any suitable tangible or non-transitory memory medium. Program instructions and data implementing certain operations, such as, for example, the DBMS, may be stored within system memory as program instructions and data storage, respectively. In other embodiments, program instructions and/or data may be received, sent or stored upon different types of computer-accessible media or on similar media separate from system memory or the database device 130. Generally speaking, a computer-readable medium may include any tangible or non-transitory storage media or memory media. The DBMS may be structured query language (SQL)-based, IBM DB2, or the like. The database can be stored in any acceptable memory technology, such as redundant array of independent disks (RAID) or the like.

The compression server device 140 operates a compression server and includes one or more processor (PROC) 142, system memory (MEM) 144, and an interface card (INT) 146 coupled together by one or more bus. One of ordinary skill in the art will readily understand that the processor 142, system memory 144, and interface card 146 of the compression server device 140 are generally the same or similar to the processor 114, system memory 116, and interface card 118, respectively, of the telephone/recording server device 110 (except for, e.g., the program instructions and/or data that may be used to operate various functions that are discussed below on respective devices), and hence, explicit discussion of these components will be omitted for brevity. Interface card 146 is coupled to a LAN 120 and may be configured to allow data to be exchanged between the compression server device 140 and another device coupled to the LAN 120, such as other computer systems, a server device and/or database device.

The LAN 120 is coupled to a network 160 that extends outside of the controlled-environment facility 102A or 102B, which can be, for example, a WAN, the Internet, Virtual Private Network (VPN), a combination thereof, or the like.

The analytics facility 104 includes a network (e.g., LAN) 170, an analytic server device 180, and a database device 190. The analytics server device 180 operates an analytics server and includes one or more processors (PROC) 182, system memory (MEM) 184, and an interface card (INT) 186 coupled together by one or more bus. One of ordinary skill in the art will readily understand that the processor 182, system memory 184, and interface card 186 of the analytics server device 180 are generally the same or similar to the processor 114, system memory 116, and interface card 118, respectively, of the telephone/recording server device 110 (except for, e.g., the program instructions and/or data that may be used to operate various functions that are discussed below on respective devices), and hence, explicit discussion of these components will be omitted for brevity. Interface card 186 is coupled to a network (e.g., LAN) 170 and may be configured to allow data to be exchanged between the analytics server device 180 and another device coupled to the LAN 170, such as other computer systems, a server device and/or database device.

The database (DB) device 190, operating a database with an appropriate database management system (DBMS), is coupled to the LAN 170, for example, using one or more interface cards (not specifically shown). The database device 190 can include one or more processors for operating the DBMS, system memory for storing program instructions of the DBMS, and database memory for storing the database. The processor, system memory, and database memory of the database device 190 are generally the same or similar to the processor, system memory, and database memory of the database device 130 discussed above, and hence, explicit discussion of these components is omitted herein for brevity. The LAN 170 is coupled to the network 160 that extends outside of the analytics facility 104.

A telephone 152 is coupled to the PSTN 150 outside of the controlled-environment facilities 102A and 102B. Also, a conference bridge 154 is coupled to the PSTN 150 with any number of connecting lines therebetween.

A person of ordinary skill in the art will also appreciate that the above-discussed computer systems (e.g., server devices and database devices) are merely illustrative and are not intended to limit the scope of the disclosure described herein. In particular, the computer systems and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Further, various modules are described below, and each may include program code instructions stored on system memory or other tangible, non-transitory memory that when operated on a processor(s) perform one or more specific tasks, such as tasks described below. The modules can each include additional sub-modules and/or one or more routines.

A resident (e.g., inmate) of the first controlled-environment facility 102A (e.g., a correctional facility) may attempt to call another resident (e.g., inmate) of the first or second controlled-environment facility 102A or 102B (e.g., another correctional facility). For example, a resident may, from telephone 106A1, attempt to call another resident at telephone 106A2 or 106B. Accounts used to place telephone calls can prevent a direct call between residents of the controlled-environment facilities 102A or 102B. These accounts may not be able to prevent residents from dialing into, e.g., an allowed conference bridge 154 that would have the same effect as a direct telephone call between the residents. Additionally, these accounts may not be able to prevent residents from dialing separate telephones (e.g., telephone 152) of an allowed individual simultaneously where the individual holds those telephones with one positioned inverted relative to the other (e.g., speaker-to-microphone) such that the two allowed calls would have the same effect as a direct telephone call between the residents. Some embodiments seek to identify instances where residents have an unauthorized conversation among themselves by identifying the identical conversation as recorded on each resident's end of the telephone call, which may be implemented on a large scale.

FIG. 2 illustrates a flowchart of a process for detecting identical conversations in accordance with some embodiments. The method of FIG. 2 is discussed below as operating in the context of the system of FIG. 1, as illustrated. One of ordinary skill in the art will readily understand that the method of FIG. 2 may operate in other environments and systems, such as in modifications of FIG. 1 discussed above or other environments and systems.

In step 202, telephone calls of residents of the controlled-environment facilities are recorded. For example, the telephone/recording server operating on the telephone/recording server device 110 includes a recording module that records each phone call in an object in the database operating on the database device 130 (e.g., via LAN 120), where the object can include an audio recording of the conversation and metadata of the call, such as the phone number of the other party on the call, the times the call began and ended, and the account of the resident on the call. The recording of the audio of each call may facilitate subsequent processing of the call; however, the recording of the audio may be omitted in other embodiments where processing of the audio is performed in real-time, for example.

For clarity, it should be noted that if two residents of the controlled-environment facilities 102A and 102B dial into an allowed conference bridge 154 and engage in a conversation together, for example, two recordings of the conversation will be made. For example, if a resident of the first controlled-environment facility 102A dials into the conference bridge 154 from telephone 106A1 and another resident of the second controlled-environment facility 102B dials into the conference bridge 154 from telephone 106B, whereby those residents engage in a conversation, a first recording of the audio containing the conversation will be made at the first controlled-environment facility 102A (using the telephone/recording server and database) from the reference point of the telephone 106A1, and a second recording of the audio containing the conversation will be made at the second controlled-environment facility 102B (using the telephone/recording server and database) from the reference point of the telephone 106B. Similarly, if a resident of the first controlled-environment facility 102A dials into the conference bridge 154 from telephone 106A1 and another resident of the first controlled-environment facility 102A dials into the conference bridge 154 from telephone 106A2, whereby those residents engage in a conversation, two recordings of the audio containing the conversation will be made at the first controlled-environment facility 102A (using the telephone/recording server and database), one from the reference point of the telephone 106A1 and another from the reference point of the telephone 106A2. The audio recordings of the same conversation in these instances would be recordings of an identical conversation, as would be understood by a human listener listening to both audio recordings, even though the audio recordings may have some differences, such as differing magnitudes of volume, differing attenuations applied to different voices, differing call dropouts, etc., due to the recordings being taken from different ends of the call.

In step 204, the audio of the telephone calls is compressed into call signatures at the controlled-environment facilities. In some embodiments, a call signature is a series of seeds, wherein each seed includes a peak frequency of a detected vowel voiced in the audio and a time difference between the detected vowel and a neighboring detected vowel voiced in the audio. In these embodiments, the actual spoken content of the audio recording represented by the call signature is not discernable from the call signature, and hence, the call signature may be considered content independent. Techniques for detecting a vowel voiced in audio and for determining the peak frequency of the detected vowel are described in U.S. patent application Ser. No. 14/674,715, entitled "Identical Conversation Detection Method and Apparatus," filed Mar. 29, 2014, which application is hereby incorporated herein in its entirety. Hence, explicit discussion of these techniques will be omitted herein for brevity. In other embodiments, the call signature may identify the content of the audio recording and, hence, may be considered content dependent. The audio can be compressed into any acceptable call signature format using any acceptable compression technique, and embodiments are not limited to how the audio recordings are compressed.

In an example, the compression server operating on the compression server device 140 includes a compression module that accesses the recorded audio of each call from the database operating on the database device 130 (e.g., via LAN 120), compresses the recorded audio into a call signature (such as discussed above), and stores the call signature back in the database (e.g., via LAN 120). The call signatures may be stored in the database as part of the respective object containing the other call metadata.

In step 206, the call signatures are transmitted from the controlled-environment facilities 102A and 102B to the analytics facility 104 for analysis. In an example, the call signatures are accessed from the database operating on the database device 130, transmitted via LAN 120, network 160, and LAN 170, and stored in the database operating on the database device 190 at the analytics facility 104.

In step 208, an index is created at the analytics facility 104, the call signatures are loaded into the index, and segments of the call signatures are associated with buckets in the index. The call signatures that are loaded into the index may be any number of call signatures. In some embodiments, the call signatures are loaded, and subsequently analyzed, in batches based on a window of time when the respective calls were made (e.g., calls made within a one hour, two hours, four hours, one day, two days, or other time frame). The larger the window is, the more likely that identical calls may be identified, such as when one resident places a call and leaves a voice message with a voicemail service, and another resident, maybe days later, retrieves that voice message. However, in some instances, larger windows may be at the cost of subsequent processing time. Additionally, the call signatures can be filtered based on other call metadata, such as the resident's account that generated the corresponding call signature. By doing so, one could more easily enlarge a timeframe to include more call signatures while narrowing the number of call signatures based on residents' demographics, for example.

The index, in some embodiments, is a hash table. The index (e.g., hash table) can include buckets that are arbitrary length segments of call signatures. The lengths of the segments that make up the buckets can be long enough to be sufficiently unique but short enough to not overly exclude matches between segments of different calls, for example. In some embodiments where the call signatures comprise sequences of seeds, the buckets are each a segment of three consecutive seeds. The buckets are created as each call signature is loaded into the index. As each call signature is loaded into the index, segments of the call signature will first be associated with existing buckets. If one or more segments of the call signature remains unassociated with a bucket after exhausting the existing buckets, one or more respective new buckets will be created in the index, and those one or more segments will be associated with a respective new bucket.

In an example, the analytics server operating on the analytics server device 180 includes an analytics module that creates the index, accesses the call signatures from the database operating on the database device 190 (e.g., via LAN 170), and loads the call signatures into the index and associates segments of the call signatures with buckets. The analytics module may store the index in the database operating on the database device 190 (e.g., via LAN 170), in the system memory 184, a combination thereof, or the like.

In step 210, for each bucket in the index, whether the number of segments associated with the bucket exceeds a threshold is determined, and in step 212, if the number of call signatures associated with that bucket exceeds the threshold, that bucket is disregarded. In some embodiments, as call signatures are being loaded into the index and segments are being associated with buckets, if a particular bucket has a number of segments associated with that bucket that exceeds the threshold, that bucket will be disregarded in subsequent processing, including being disregarded such that any further segments that are to be loaded are not associated with that bucket despite a matching sequence between a segment and the bucket. In some embodiments, the threshold can be a number that is sufficiently high to render the number of calls associated with the bucket unlikely to be from an identical conversation. In some embodiments, the threshold is twenty, fifty, or more, for example.

The inventor has discovered that when a sufficiently large number of call signatures contain the same segment sequence (e.g., associated with a bucket), the cause is generally not from calls among residents that result in an identical conversation being recorded at two or more instances, but from, for example, automated prompts that may be inserted by a facility's telephone system into the conversations of the calls, which generally can occur in a large number of calls. These automated prompts, for example, can generate false positives when attempting to identify identical conversations, and due to the large number of matches, can be a significant drain on processing time if the prompts are not disregarded.

In an example, the analytics module analyzes the index to determine if each bucket has a number of associated call signatures that exceeds the threshold, and will disregard the buckets that exceed the threshold. The analytics module can flag the bucket in the index in order to provide an indication that subsequent processing should disregard that bucket, for example.

In step 214, for each non-disregarded bucket in the index, which (if any) buckets are associated with two or more call signatures are identified, and a match between those call signatures are attempted to be extended to determine if those call signatures represent an identical conversation. The attempting matching extension can originate at segments of two or more call signatures that are associated with a bucket and extend forward and backward along the call signatures in an attempt to determine a duration of likely matching call signatures that would indicate an identical conversation. The attempted matching extension can be based on a probability and/or statistical analysis. In reality, dropouts from audio of a call can frequently occur such that the audio recorded from one reference point (e.g., from telephone 106A1) is different (at least in a small amount) from the audio recorded from another reference point (e.g., from telephone 106B), even though an identical conversation is recorded from both of those reference points. Hence, the extension may be more robust by calculating, or including a consideration of, a likelihood that call signatures contain a representation of an identical conversation, even though there may not be a complete identity of segments of the call signatures over which the matching extension is attempting to determine a match. Along these lines, any buckets that were disregarded may be treated as dropouts in the call signatures, such that the disregarding of those buckets may not adversely affect the matching of identical conversations.

In an example, the analytics module performs the identification of buckets and attempts to extend matches as discussed above for step 214. The analytics module can store the flags for likely identical conversations with respective call signatures in the index, in respective objects containing call data (such as metadata) in a database, or in a separate list stored on system memory and/or in a database. The flags can be used to generate a report that is transmitted to authorities at respective controlled-environment facilities 102A and 102B for investigation to determine if an unauthorized communication was made.

In some embodiments the invention processes large numbers of call recordings by using algorithms optimized according to the number of identical conversations recorded therein. Accordingly, such embodiments can achieve shorter processing times and fewer false positives by attempting to identify multiple instances of an identical conversation being recorded. By disregarding buckets that are statistically more indicative of, for example, automated prompts inserted into a conversation or the like than two or more instances of recording an identical conversation, false positives can be disregarded, and processing resources may be removed from analyzing false positives. This can allow detection of audio of telephone calls recorded at different reference points as containing an identical conversation being more easily and efficiently used at a large scale.

An example method comprises using an analytics module operating on at least one processor, receiving call signatures for a plurality of voice communications, creating an index loaded with the call signatures, wherein segments of the call signatures are associated with buckets of the index, identifying a first subset of the buckets that are associated with a number of the segments that exceeds a threshold number, and identifying an identical conversation portion in two or more of the plurality of voice communications based on a second subset of the buckets, wherein the first subset of one or more of the buckets is disregarded. The index may be a hash table.

The call signatures may be content independent. The call signatures may comprise sequences of seeds, each of the seeds comprising a peak frequency of a first vowel voiced in a respective one of the plurality of voice communications and a time difference between the first vowel and a second vowel voiced in the respective one of the plurality of voice communications. The buckets may be associated with segments of three seeds, each of the seeds comprising a peak frequency of a first vowel voiced in a respective one of the plurality of voice communications and a time difference between the first vowel and a second vowel voiced in the respective one of the plurality of voice communications. The threshold number may be large enough to render each of the buckets of the first subset to be statistically unlikely to indicate an identical conversation portion between respective call signatures associated with the respective bucket of the first subset.

The method may further comprise using a recording module operating on at least one processor, recording the voice communications. The method may further comprise using a compression module operating on at least one processor, compressing the plurality of voice communications into the call signatures.

An example system comprises one or more compression servers having one or more compression modules operable on at least one processor, the one or more compression modules being operable to generate call signatures from voice communications; and an analytics server having an analytics module operable on at least one processor, the analytics module being operable to create an index and load the call signatures into the index, the index having buckets that are associated with segments of the call signatures, the analytics module further being operable to disregard ones of the buckets that are associated with a number of the call signatures that exceeds a threshold number, and operable to identify an identical conversation portion in two or more of the voice communications based on non-disregarded ones of the buckets. The index may be a hash table.

The system may further comprise a recording server having a recording module operable on at least one processor, the recording module being operable to store the voice communications to memory. The call signatures may comprise seeds, each of the seeds comprising a peak frequency of a first vowel voiced in a respective one of the audio of telephone calls and a time difference between the first vowel and a second vowel voiced in the respective one of the voice communications. The buckets may be segments of three seeds, each of the seeds comprising a peak frequency of a first vowel voiced in a respective one of the voice communications and a time difference between the first vowel and a second vowel voiced in the respective one of the voice communications.

The analytics server may be at an analytics facility, and the one or more compression server may comprise a first compression server on a first compression server device, the first compression server having a first compression module of the one or more compression modules operable on at least one processor, the first compression server device being located at a first controlled-environment facility remote from the analytics facility, and a second compression server on a second compression server device, the second compression server having a second compression module of the one or more compression modules operable on at least one processor, the second compression server device being located at a second controlled-environment facility remote from the analytics facility, the second controlled-environment facility being remote from the first controlled-environment facility.

In embodiment, a non-transitory computer-readable storage medium has a computer program embodied thereon. The computer program comprises program code instructions for creating an index loaded with call signatures, the call signatures being representative of voice communications, the index having buckets, segments of the call signatures being associated with the buckets; program code instructions for identifying buckets that are associated with a number of call signatures that exceeds a threshold; and program code instructions for determining whether two or more voice communications contain an identical conversation portion based on buckets that are associated with a number of call segments that does not exceed the threshold, wherein the buckets that are associated with the number of segments that exceeds the threshold are disregarded. The index may be a hash table.

The computer program may comprises program code instructions for receiving the call signatures. The call signatures may comprise a sequence of seeds, each of the seeds comprising a peak frequency of a first vowel voiced in a respective one of the voice communications and a time difference between the first vowel and a second adjacent vowel voiced in the respective one of the voice communications. The buckets may be segments of at least three seeds, each of the seeds comprising a peak frequency of a first vowel voiced in a respective one of the voice communications and a time difference between the first vowel and a second adjacent vowel voiced in the respective one of the voice communications. The threshold may be, for example, twenty, fifty, one-hundred, or some other number useful for eliminating often-heard prompts or similar sounds.

Although some embodiments and their advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
using an analytics module operating on at least one processor:
receiving call signatures for a plurality of voice communications;
associating a plurality of segments of the received call signatures with buckets of a hash table, wherein the call signature segments are associated with buckets based on a similarity to call signature segments already associated with the respective bucket;
identifying a first subset of the buckets that are associated with a number of the segments that exceeds a threshold number; and
identifying an identical conversation portion in two or more of the plurality of voice communications based on a second subset of the buckets that does not include the first subset buckets.

2. The method of claim 1, wherein the call signatures are content independent.

3. The method of claim 1, wherein the call signatures comprise sequences of seeds, each of the seeds comprising a peak frequency of a first vowel voiced in a respective one of the plurality of voice communications and a time difference between the first vowel and a second vowel voiced in the respective one of the plurality of voice communications.

4. The method of claim 1, wherein the buckets are associated with segments of three seeds, each of the seeds comprising a peak frequency of a first vowel voiced in a respective one of the plurality of voice communications and a time difference between the first vowel and a second vowel voiced in the respective one of the plurality of voice communications.

5. The method of claim 1, wherein the threshold number is large enough to render each of the buckets of the first subset to be statistically unlikely to indicate an identical conversation portion between respective call signatures associated with the respective bucket of the first subset.

6. The method of claim 1 further comprising, using a recording module operating on at least one processor, recording the voice communications.

7. The method of claim 1 further comprising, using a compression module operating on at least one processor, compressing the plurality of voice communications into the call signatures.

8. A system comprising:
one or more compression servers having one or more compression modules operable on at least one processor, the one or more compression modules being operable to generate call signatures from voice communications; and
an analytics server having an analytics module operable on at least one processor, the analytics module being operable to associate a plurality of segments of the call signatures with buckets of a hash table, wherein the call signature segments are associated with buckets based on a similarity to call signature segments already associated with the respective bucket, the analytics module further being operable to disregard ones of the buckets that are associated with a number of the call signatures that exceeds a threshold number, and operable to identify an identical conversation portion in two or more of the voice communications based on non-disregarded ones of the buckets.

9. The system of claim 8 further comprising:
a recording server having a recording module operable on at least one processor, the recording module being operable to store the voice communications to memory.

10. The system of claim 8, wherein the call signatures comprise seeds, each of the seeds comprising a peak frequency of a first vowel voiced in a respective one of the audio of telephone calls and a time difference between the first vowel and a second vowel voiced in the respective one of the voice communications.

11. The system of claim 8, wherein the buckets are segments of three seeds, each of the seeds comprising a peak frequency of a first vowel voiced in a respective one of the voice communications and a time difference between the first vowel and a second vowel voiced in the respective one of the voice communications.

12. The system of claim 8, wherein the analytics server is at an analytics facility, and the one or more compression server comprises:
a first compression server on a first compression server device, the first compression server having a first compression module of the one or more compression modules operable on at least one processor, the first compression server device being located at a first controlled-environment facility remote from the analytics facility, and
a second compression server on a second compression server device, the second compression server having a second compression module of the one or more compression modules operable on at least one processor, the second compression server device being located at a second controlled-environment facility remote from the analytics facility, the second controlled-environment facility being remote from the first controlled-environment facility.

13. A non-transitory computer-readable storage medium having a computer program embodied thereon, the computer program comprising:
program code instructions for receiving call signatures for a plurality of voice communications;
program code instructions for associating a plurality of segments of the received call signatures with buckets of a hash table, wherein the call signature segments are associated with buckets based on a similarity to call signature segments already associated with the respective bucket;
program code instructions for identifying buckets that are associated with a number of call signatures that exceeds a threshold; and
program code instructions for determining whether two or more voice communications contain an identical conversation portion based on buckets that are associated with a number of call segments that does not exceed the threshold, wherein the buckets that are associated with the number of segments that exceeds the threshold are disregarded.

14. The non-transitory computer-readable storage medium of claim 13, wherein the computer program comprises program code instructions for receiving the call signatures.

15. The non-transitory computer-readable storage medium of claim 13, wherein the call signatures each comprise a sequence of seeds, each of the seeds comprising a peak frequency of a first vowel voiced in a respective one of the voice communications and a time difference between the first vowel and a second adjacent vowel voiced in the respective one of the voice communications.

16. The non-transitory computer-readable storage medium of claim 13, wherein the buckets are segments of at least three seeds, each of the seeds comprising a peak frequency of a first vowel voiced in a respective one of the voice communications and a time difference between the first vowel and a second adjacent vowel voiced in the respective one of the voice communications.

17. The non-transitory computer-readable storage medium of claim 13, wherein the threshold is twenty.

* * * * *